United States Patent
Potier et al.

(10) Patent No.: US 12,480,535 B2
(45) Date of Patent: Nov. 25, 2025

(54) ROTARY ACTUATOR

(71) Applicant: Goodrich Actuation Systems SAS, Vernon (FR)

(72) Inventors: Karl Potier, Paris (FR); Quentin Ricard, Eaubonne (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/661,957

(22) Filed: May 13, 2024

(65) Prior Publication Data

US 2024/0392811 A1 Nov. 28, 2024

(30) Foreign Application Priority Data

May 25, 2023 (EP) .................................... 23305832

(51) Int. Cl.
  *F15B 15/06* (2006.01)
(52) U.S. Cl.
  CPC .................. *F15B 15/063* (2013.01)
(58) Field of Classification Search
  CPC ....... F15B 15/06; F15B 15/063; F15B 15/068
  See application file for complete search history.

(56) References Cited

U.S. PATENT DOCUMENTS

| | | |
|---|---|---|
| 4,426,911 A | 1/1984 | Robinson et al. |
| 4,667,528 A | 5/1987 | Weyer |
| 4,738,415 A | 4/1988 | Weyer |
| 4,945,779 A | 8/1990 | Williams |
| 10,527,142 B2 | 1/2020 | Nguyen et al. |
| 11,015,728 B2 | 5/2021 | Spickard et al. |
| 2004/0000811 A1 | 1/2004 | Kehler |
| 2021/0310547 A1* | 10/2021 | Mellor ................ F16H 25/2204 |

FOREIGN PATENT DOCUMENTS

JP  S62215103 A  9/1987

OTHER PUBLICATIONS

Abstract for JPS62215103 (A), Published: Sep. 21, 1987, 1 page.
European Search Report for Application No. 23305832.0, mailed Oct. 24, 2023, 6 pages.

* cited by examiner

*Primary Examiner* — Nathaniel E Wiehe
*Assistant Examiner* — Daniel S Collins
(74) *Attorney, Agent, or Firm* — CANTOR COLBURN LLP

(57) ABSTRACT

A rotary actuator includes an actuator body having a first end and a second end defining an interior of the actuator body therebetween, an axis X of the body being between the first and second ends. Each end is provided with a port arranged to receive hydraulic fluid. The actuator also includes: mounting parts extending from the ends into the interior of the actuator body a screw mounted to the mounting parts within the actuator body between the first and second ends, the screw mounted to the mounting parts via splines to allow linear axial translation of the screw relative to the mounting parts. The screw having one or two walls extending across an inner diameter d of the screw.

9 Claims, 1 Drawing Sheet

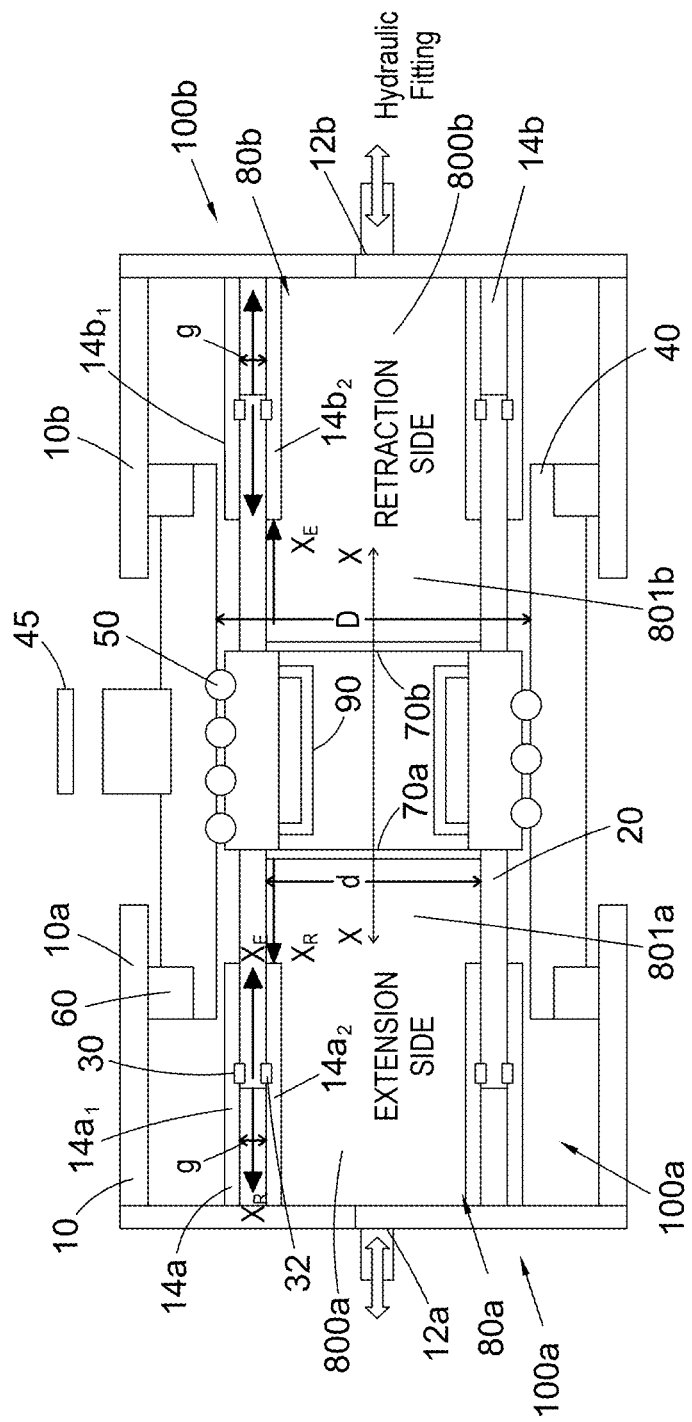

ROTARY ACTUATOR

CROSS REFERENCE TO RELATED APPLICATIONS

This application claims priority to European Patent Application No. 23305832.0 filed May 25, 2023, the entire contents of which is incorporated herein by reference.

TECHNICAL FIELD

The present disclosure relates to rotary actuators.

BACKGROUND

Actuators find many applications, particularly in controlling movement of a moveable component. In aircraft, many moveable components and surfaces are moved by means of an actuator.

Conventionally, many actuators, particularly in vehicles, aircraft, heavy machinery etc. are hydraulic actuators where components are moved in response to hydraulic or pressurized fluid. In general terms, a hydraulic actuator comprises a cylindrical housing in which is mounted an axially moveable piston rod. A head of the rod, inside the housing, divides the housing into two chambers each having a fluid port via which pressurised fluid can be injected into the chamber or low pressure fluid exits the chamber, so as to change the relative pressure in the two chambers either side of the piston head, thus causing movement of the piston relative to the housing. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator, which is in response to a control signal. As the piston rod moves relative to the housing, the moveable component or surface to which it is attached will move accordingly.

Whilst hydraulic actuators have proven reliable and effective particularly in large load applications, the hydraulic parts of the system add considerably to the overall weight and size of the system. Also, hydraulic systems are subject to leakage and are not particularly clean.

There has, in recent years, been a move to replace hydraulic systems, in many fields, such as in aviation, with electrical or partly electrical systems which have reduced weight and footprint compared to hydraulic systems. With the move towards 'more electric aircraft' (MEE) or 'all electric aircraft' (AEE), for example, there has been a move towards using electromechanical actuators (EMA) to control the movement of movable surfaces and components.

Other types of actuators commonly in use, which may also use electric power, are electrohydraulic actuators (EHA), electrohydrostatic actuators (EHSA), and electrical back-up hydraulic actuators (EBHA).

Conventionally, actuators (such as described above) are linear actuators where movement of the piston is a linear movement out of the cylinder, powered by hydraulic fluid.

Linear actuators, however, require a relatively large envelope to operate. In some applications, such actuators take up too much space to be feasible. One example is in so-called thin wing aircraft. Such thin wings do not provide sufficient space for conventional linear actuators to be installed to move e.g. wing flaps/ailerons. Other applications may also require a more compact actuator.

A type of actuator that can be installed within a smaller envelope is a rotary actuator in which power applied to the actuator causes rotation of an actuator member which is attached to a part to be moved (e.g. along or in parallel with the hinge of the part to be moved) to causes corresponding movement of the part. Electric power is well-suited to rotary motion (electric motors provide rotary motion) and compact rotary EMAs have been developed. Whilst these have been found to operate well, the type of power most available in many applications e.g. on aircraft, is hydraulic power. Typically, hydraulic power is better suited to linear motion. It would be desirable to design a rotary actuator that makes use of the more readily available, more power dense hydraulic power but that still has a compact design for use where space is limited e.g. in the wings (especially wing tips) of thin winged aircraft.

SUMMARY

According to the present disclosure, there is provided a rotary actuator comprising: an actuator body having a first end and a second end defining an interior of the actuator body therebetween, an axis X of the body being between the first and second ends, each end provided with a port arranged to receive hydraulic fluid; mounting parts extending from the ends into the interior of the actuator body; a screw mounted to the mounting parts within the actuator body between the first and second ends, the screw mounted to the mounting parts via splines to allow linear axial translation of the screw relative to the mounting parts; the screw having one or two walls extending across an inner diameter d of the screw; the actuator body, the mounting parts and the wall or walls defining a first chamber in fluid communication with the port at the first end of the actuator body and a second chamber in fluid communication with the port at the second end of the actuator body; a first piston having a piston head located within the first chamber, a second piston with a piston head located within the second chamber; a nut mounted within the actuator body around the screw, the nut having an inner diameter D; ball bearings between the screw and the nut such that axial movement of the screw relative to the mounting parts causes rotational movement of the ball bearings which causes rotation of the nut relative to the screw and to the body; the splines being provided radially between the nut and the screw and so within the inner diameter D of the nut; wherein the axial translation of the screw is caused by the force of hydraulic fluid in the first or second chamber, from the port, pushing against the piston, the piston head of which pushes against the wall or walls defining the chamber.

BRIEF DESCRIPTION OF THE FIGURE

The FIGURE shows one example of a rotary actuator according to the disclosure.

It should be noticed that this is one example only and variations are possible within the scope of the claims.

DETAILED DESCRIPTION

The rotary actuator comprises an actuator body 10 defining a first side 100a and a second side 100b of the rotary actuator. For the purposes of describing operation of the actuator, the axial direction is along an axis X of the housing from one side to the other. The body in the example shown is made up of two opposing end parts 10a, 10b which are essentially cup-shaped to receive the actuator parts in an interior 15 of the actuator body as described further below. The general overall shape of the rotary actuator is preferably cylindrical, but other shapes may be possible. Each of the body end parts 10a, 10b is provided with a port 12a, 12b for fluid connection e.g. via a hydraulic fitting, to a source of hydraulic fluid (not shown). Each body end part has an inwardly extending mounting part 14a, 14b onto which a screw 20 is mounted. The screw is mounted to the mounting parts 14a, 14b via splines 30 such that the screw can translate relative to and along the mounting parts. In the example shown, the mounting parts 14a, 14b each comprise a pair of flanges 14a1, 14a2, 14b1, 14b2 defining a gap g therebetween. The screw 20 is mounted, via the splines 30 and seals 32, in the gap g. A rotating nut 40 is mounted around the screw 20 via ball bearings 50. The screw 20 has an inner diameter d. The nut 40 has an inner diameter D. The rotating nut 40 is mounted within the body 10 via bearings 60 such that the nut 40 is able to rotate relative to the actuator body 10. The rotating nut 40 is configured to be attached to the part (not shown) to be moved by the actuator, e.g. an aileron to be lifted or pivoted relative to the body of an aircraft wing, e.g. by a surface attachment 45.

The translating screw 20 is an elongate cylindrical screw mounted around the mounting parts of the actuator body and is provided with one or two walls 70a, 70b which extend across the inner diameter d of the screw 20, axially inwards of the mounting parts 14a, 14b. The body end parts 10a, 10b and their mounting parts 14a, 14b, together with the wall or walls (70a, 70b) define a first and a second chamber 80a, 80b within which is located a piston 800a, 800b in fluid communication with the respective ports 12a, 12b. In the example shown, the screw has first 70a and second 70b walls axially spaced apart such that the first wall defines, with the first body end part 10a, the first chamber 80a, containing a first piston 800a, and the second wall 70b defines, with the second body end part 10b, the second chamber 80b, containing a second piston 800b. In this case, shortcuts (described further below) can be provided in the portion of the inner diameter of the screw 20 between the first and the second wall. It is however, feasible that the chambers could be defined by a single common (central) wall, in which case the shortcuts feature would not be present.

The pistons are configured such that the piston heads 801a, 801b are sized to be received within the chamber defined by the screw, and so within the envelope of the screw.

The splines 30 and the seals 32 are located between the mounting parts 14a, 14b and the screw within the interior of the nut 40 defined by its inner diameter D—i.e. within the envelope of the nut 40.

Seals may be provided around the ports and also around the splines to avoid leakage of hydraulic fluid.

Operation of the rotary actuator will now be described with reference to the example of the FIGURE.

The rotary actuator is powered by a hydraulic fluid. The hydraulic operation is linear (axial) causing linear translation of the screw 20. The linear translation of the screw causes the balls 50 to rotate and cause corresponding rotation of the nut 40 relative to the actuator body 10. This causes rotation of the part attached to the nut.

Depending on the desired direction of rotation of the actuator, hydraulic fluid is provided to one of the first or the second chamber 80a, 80b via the respective port 12a, 12b.

In the example shown, the first chamber 80b is indicated as the 'extension side' and the second chamber 80b is indicated as the 'retraction side'. If hydraulic fluid is caused (by the actuator controller (not shown) to flow into the first port 12a and thus into the extension side chamber 80a, pressure increases in that chamber 80a, which is delimited by the wall 70a. As the pressure exceeds a predetermined threshold it acts against respective piston 80a such that its piston head 801a pushes against the wall 70a thus pushing the screw in direction XE relative to the mounting parts 14a, 14b via the splines 30. Movement of the screw in this direction causes rotation of the balls 50 in a first direction which, in turn, causes rotation of the nut 40 in a first direction relative to the body, guided by bearings 60. The linear movement of the screw in direction XE also causes the wall 70b to push against the piston head 801b and move it further into the second (retraction side) chamber 80b forcing hydraulic fluid out of the second port 12b to a hydraulic fluid reservoir (not shown).

For rotation of the actuator in the opposite direction, hydraulic fluid enters the second port 12b into the second (retraction side) chamber 80b and the force pushes against the piston head 801a, pushing against the wall 70b causing the screw to move along the splines in direction XR. This causes rotation of the balls in a second direction, opposite the first direction, causing corresponding rotation of the nut (and, therefore, an attached part).

As mentioned above, shortcut features 90 may be provided radially inside the screw to provide a path (or cartridge) for recirculation of the balls 50 as they reach the end of their path when the screw translates. In an alternative example (not shown) such shortcuts could be provided on the nut side of the actuator.

The ball screw 20 is sized to sustain the output torque and defines an envelope. The piston heads are located within the envelope of the ball screw, i.e. radially inwards of the ball screw. Furthermore, the design of the disclosure takes advantage of the width difference between the nut 40 and the screw 20 to locate the seals 32 and the splines 30 within the envelope of the ball screw and essentially in line with the piston heads. This means that the actuator is hardly wider than the width of the piston part of a standard actuator.

The design of the rotary actuator is compact and its size is only dictated by the size of the ball screw. The hydraulic parts of the actuator can be relatively small since the hydraulic power is only required to cause translation of the screw, in the linear dimension, which is then translated to the rotary motion of the nut.

The compact design of the rotary actuator means that it is suitable where space is limited e.g. in the wings of thin winged aircraft. The actuator can be fitted into the line of the hinge between the two relatively moveable parts (e.g. wing body and wing flat)—i.e. can be an in-hinge design. The compact hydraulic linear-mechanical rotary actuator design can, however, also be used as an off-hinge actuator.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A rotary actuator comprising:
an actuator body having a first end and a second end defining an interior of the actuator body therebetween, an axis X of the body being between the first and second ends, each end provided with a port arranged to receive hydraulic fluid;
mounting parts extending from the ends into the interior of the actuator body
a screw mounted to the mounting parts within the actuator body between the first and second ends, the screw mounted to the mounting parts via splines to allow linear axial translation of the screw relative to the mounting parts; the screw having one or more walls extending across an inner diameter d of the screw;
the actuator body, the mounting parts and the one or more walls defining a first chamber in fluid communication with the port at the first end of the actuator body and a second chamber in fluid communication with the port at the second end of the actuator body;
a first piston having a piston head located within the first chamber;
a second piston with a piston head located within the second chamber;
a nut mounted within the actuator body around the screw, the nut having an inner diameter D;
ball bearings between the screw and the nut such that axial movement of the screw relative to the mounting parts causes rotational movement of the ball bearings which causes rotation of the nut relative to the screw and to the body;
wherein the splines are provided radially between the nut and the screw and so within the inner diameter D of the nut;
wherein the axial translation of the screw is caused by the force of hydraulic fluid in the first or second chamber, from the port, pushing against the piston, the piston head of which pushes against the wall or walls defining the chamber;
wherein each of the mounting parts comprises a pair of flanges separated by a gap (g); and
wherein the screw is mounted, via the splines, in the gap.

2. The rotary actuator of claim 1, wherein the screw has two walls extending across the inner diameter of the screw, wherein a first of the two walls defines the first chamber and a second of the two walls defines the second chamber.

3. The rotary actuator of claim 1, further comprising:
bearings between the nut and the actuator body.

4. The rotary actuator of claim 1, further comprising:
seals disposed between the screw and the mounting parts.

5. The rotary actuator of claim 1, further comprising:
a surface attachment part for attaching the rotary actuator, in use, to a part to be moved by the rotary actuator.

6. The rotary actuator of claim 1, wherein the first end and the second end of the actuator body are formed as opposing cup-shaped housing parts.

7. The rotary actuator of claim 1, further comprising:
a ball cartridge provided radially inside the screw to provide a path for recirculation of the ball bearings as they reach an end of a path when the screw translates.

8. The rotary actuator of claim 1, further comprising:
a source of hydraulic power in fluid communication, in use, with the ports.

9. The rotary actuator of claim 1, arranged to be fitted to a moveable panel of an aircraft.

* * * * *